Jan. 8, 1946.   J. P. MINTON ET AL   2,392,758
METHOD AND APPARATUS FOR RECORDING SEISMIC WAVES
Filed June 27, 1941   3 Sheets—Sheet 2
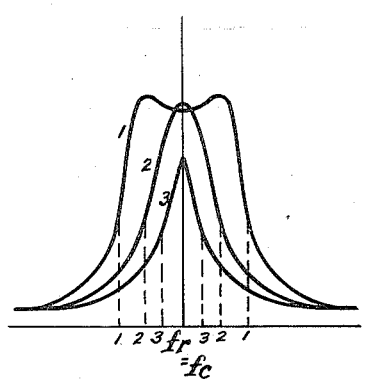
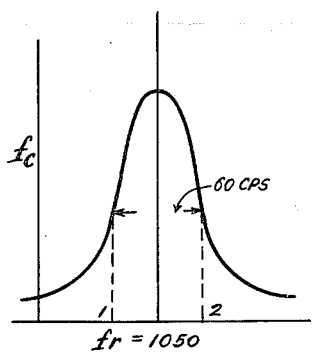
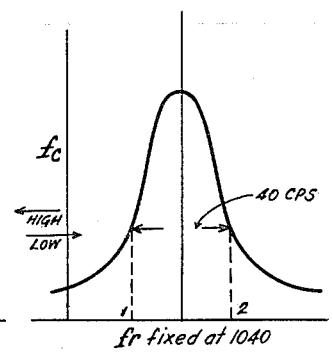
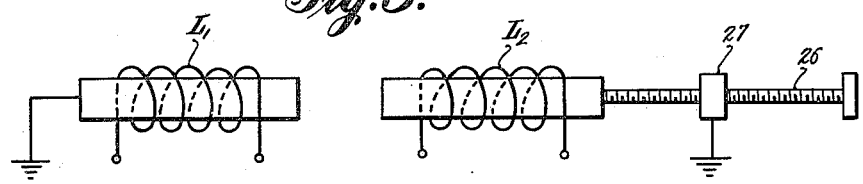
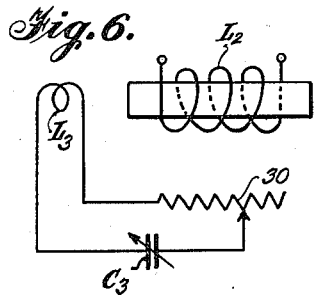
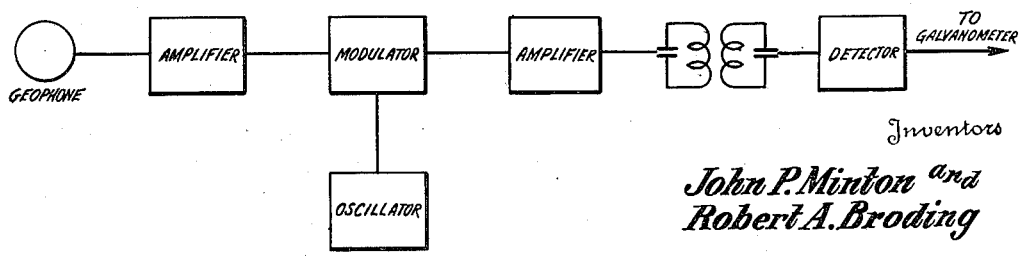
Inventors
John P. Minton and
Robert A. Broding
By Dallas R. Lamont
Attorney Jan. 8, 1946.  J. P. MINTON ET AL  2,392,758

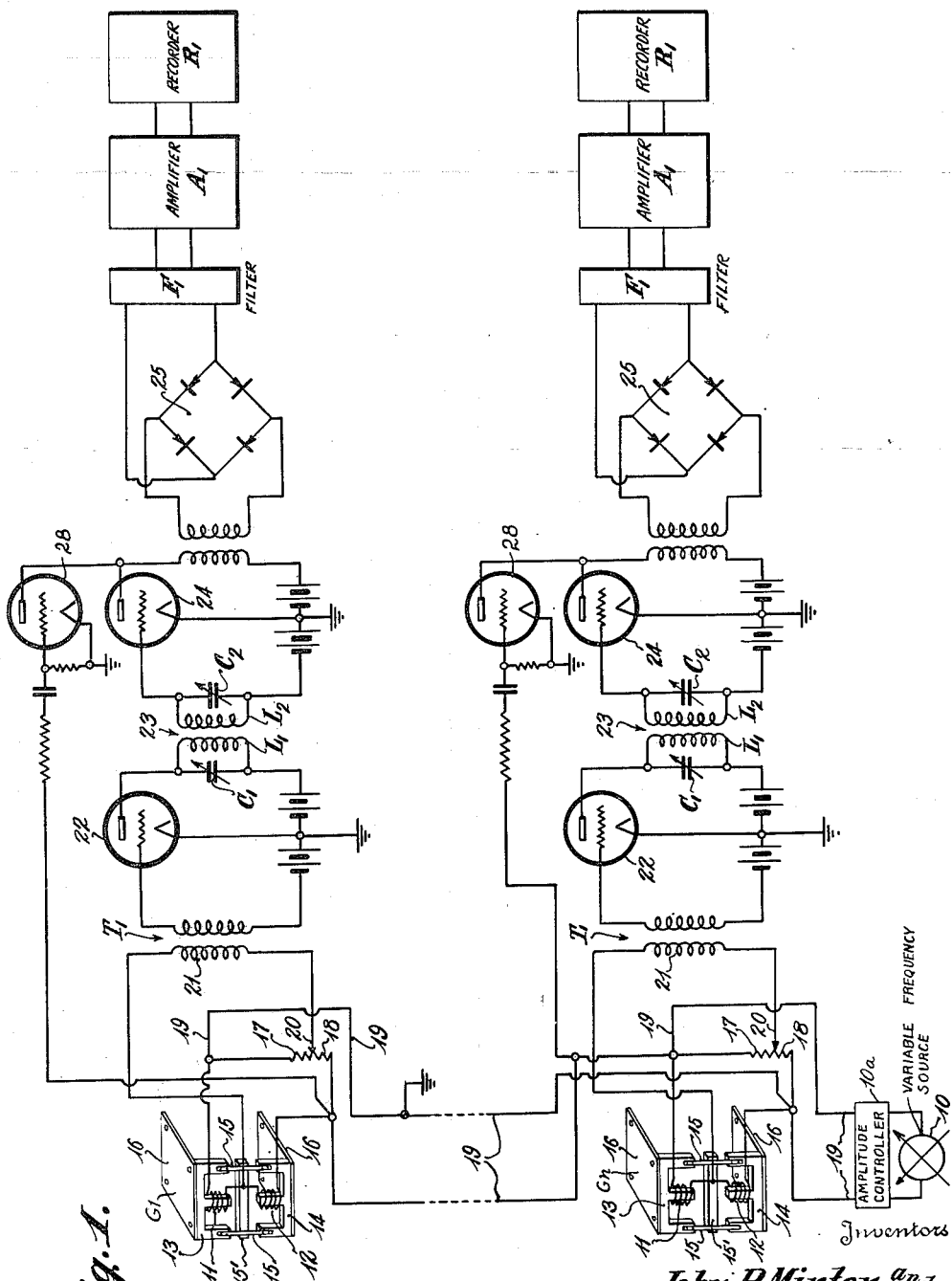

METHOD AND APPARATUS FOR RECORDING SEISMIC WAVES

Filed June 27, 1941     3 Sheets-Sheet 3

Inventors
John P. Minton and
Robert A. Broding
By
Dallas R. Lamont
Attorney

Patented Jan. 8, 1946

2,392,758

UNITED STATES PATENT OFFICE 2,392,758

METHOD AND APPARATUS FOR RECORDING SEISMIC WAVES

John P. Minton and Robert A. Broding, Dallas, Tex., assignors to Socony-Vacuum Oil Company, Incorporated, New York, N. Y., a corporation of New York Application June 27, 1941, Serial No. 400,076

12 Claims. (Cl. 177—352)

This invention relates to seismic prospecting and more particularly to a novel arrangement of apparatus and method steps whereby the detected seismic waves may be more expediently prepared for recording and the record thereof may be made more informative.

Prior to this invention it has been the practice to detect and convert seismic waves into electrical waves, amplify these electrical waves, filter out waves of unwanted frequencies and operate a recorder from the waves that remain. Since the signals transmitted most readily through the earth are in the frequency spectrum below 100 cycles, this has meant amplifying and filtering waves of that order of frequency.

A number of serious difficulties have arisen in connection with the above mentioned, usual procedure. In any series of waves arriving at a geophone as the result of a distant explosion, the first arriving waves, because they have traveled only a relatively short distance are stronger and produce greater impulses at the geophone than do the later arriving waves which are progressively weaker because they have traveled farther through the earth. Also, the predominant frequency of the waves arriving at different times varies due to the filtering and absorption action of the earth.

In order to obtain the best results it is desirable that the seismograph detecting and recording system be made progressively more sensitive during the reception of any given series of waves and that the frequency response of the system also be changed to correspond with the predominant frequency of the seismic waves as they arrive. It is also desirable that the frequency of response of the system be selective so as to eliminate stray vibrations which should not be recorded.

Methods are in use for increasing the sensitivity of the ordinary seismic system during the reception of a train of waves. Numerous filtering methods have been used to narrow the frequency response of these systems, and methods have been proposed for changing the frequency response during the reception of a series of waves. However, considerable difficulty has been experienced in accomplishing these things because it is difficult to filter such low frequencies as those below 100 cycles, difficult to eliminate stray pickup from such things as power lines and the like and difficult to change the frequency of response of such a system during operation.

According to the present invention a method and system are provided which to a large extent eliminates power line pickup, permits accurate filtering and makes it possible to change both the degree of amplification and the frequency of response of the system during the reception of a train of waves.

The fundamental basis of the new method and apparatus is the conversion of the seismic wave into a modulated wave of higher frequency, the filtering of this higher frequency wave and the recording of its envelope, the demodulated wave, or a signal whose frequency is that of the modulating wave. By this arrangement the ground wave is immediately converted into a relatively high frequency wave at the geophone and any wave of lower frequency that is picked up between the geophone and the filtering circuit is eliminated by the filtering circuit.

Resonant coupling may be used for the purpose of filtering and this expedites the filtering and helps to make possible the changing of the frequency response of the system during the reception of a series of waves.

Another important part of this invention is the use of a reactance type geophone to modulate a carrier current that is thereafter to be filtered and recorded. By varying the amplitude of the carrier the sensitivity of the instrument may then be varied and by varying the frequency of the carrier the frequency of the response may be varied.

A still further important feature of this invention is the possible use of the same source of carrier wave for several geophone-filter-recorder channels. By doing this the amplitude and frequency of the carrier wave may be varied to vary the sensitivity and frequency of response of all of the channels at the same time.

This invention further contemplates a seismic recording system in which a single master oscillator is used to supply a plurality of geophones with a carrier wave without mutual interference.

Still further advantages may be had by connecting the reactance geophone in either a balanced or an unbalanced circuit depending upon what is desired, as will be hereafter set forth.

It is to be understood that while the combination of the steps of converting the seismic waves into a modulated carrier wave, filtering this carrier wave by resonant coupling, modulating the carrier wave in the beginning by use of a reactance type geophone, and utilizing a single source of carrier wave for several channels, all fit together into a single very desirable system, the various features may be used singly or separately in other seismograph systems and such use is contemplated by this invention and intended to be covered by the appended claims. Other types of geophones with additional accessory equipment may, for example, be utilized to modulate a carrier wave, other types of filtering than resonant coupling may be used, the resonant coupling may be changed to change the frequency of response instead of changing the carrier frequency, and the source of carrier current may be used for only one channel instead of several.

A more complete understanding of the details of this invention and of its many advantages may be obtained from the following detailed description of a preferred embodiment thereof and from the appended drawings illustrating this embodiment.

In the drawings:

Figure 1 shows a circuit diagram applying the instant invention to an electric seismograph having a plurality of channels;

Figure 2 shows a group of resonance curves plotted with frequency as abscissae and voltage as ordinates;

Figure 3 shows a resonance curve that has been plotted with frequency as abscissae and voltage as ordinates illustrating the side band transmission;

Figure 4 shows a single resonance curve plotted with frequency as abscissae and voltage as ordinates illustrating the manner in which variable frequency control can be obtained with a band pass filter;

Figure 5 is a diagrammatic illustration of means for varying the resonance coupling between two inductances mechanically;

Figure 6 is a second diagrammatic illustration of means for varying the resonance coupling between two inductances electrically;

Figure 7 is a diagrammatic illustration of a single channel of an electric seismograph showing the use of resonance coupling with a conventional type geophone;

Figure 10:
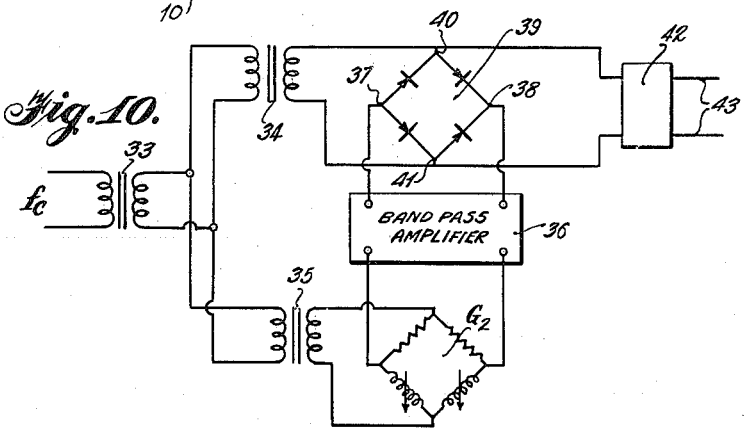
Figure 11:
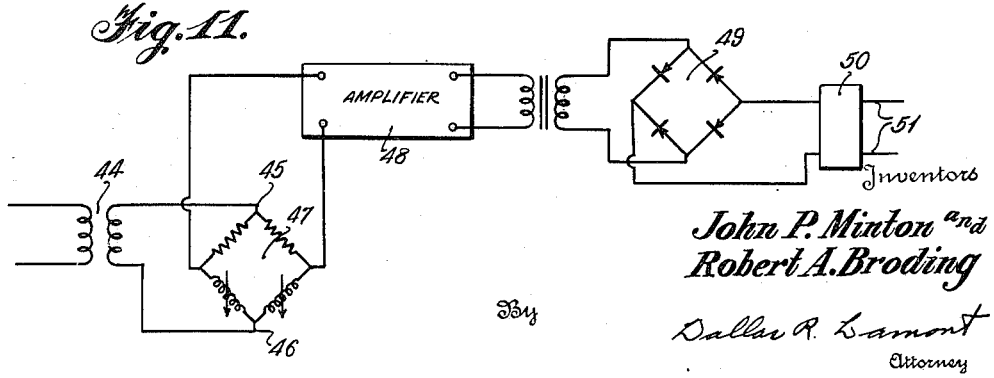

Figure 10 shows a wiring diagram shown in part diagrammatically illustrating the manner in which double frequencies can be eliminated to give a signal having the frequency of the seismic waves being detected; and Figure 11 illustrates in part diagrammatically a seismograph channel which utilizes an unbalanced reactance bridge circuit for detecting seismic waves that gives an output signal having the frequency of the seismic waves.

Referring to the drawings in detail, particularly Figure 1, the wiring diagram in part diagrammatically shown serves to illustrate the apparatus by means of which the instant invention is practiced. A variable frequency oscillator 10 provides a constant frequency carrier current for the geophones $G_n$ and $G_1$. Suitable means $10a$ are provided to control the amplitude of the carrier produced by the oscillator 10. As well understood by those skilled in the art, the amplitude may be manually and/or automatically controlled. Geophones $G_n$ and $G_1$ are of the reactance type. Each geophone is provided with two coils 11 and 12 that may be fixed on iron cores 13 and 14, and adapted to move with them. Cores 13 and 14 may be of E-shaped laminations and mechanically connected together as, for example, by links 15 and the unit resiliently suspended inside the case by means of leaf springs 16. An iron armature 15' fixed to the geophone case, not shown, and adapted to move therewith, is disposed between the cores 13 and 14. The cores 13 and 14 carrying the coils 11 and 12, are so disposed that relative movement between the cores and armature 15' will effect a change in the inductance of each coil such that as the inductance of one coil increases, the inductance of the other will decrease. Coils 11 and 12 form two arms of a reactance bridge circuit, the other two arms being formed by the resistances 17 and 18. The carrier current is supplied to the geophone by means of the conductors 19 and this carrier current is modulated by the relative movement of the cores 13 and 14 with the coils 11 and 12 at the frequency of the seismic waves.

By effecting a balance of the reactance bridge circuit by adjusting the variable tap 20 between the resistances 17 and 18, the carrier wave supplied by the conductors 19 to the geophone can be completely suppressed giving an output signal across the winding 21 of the transformer $T_1$, that will be in the form of side bands and equal to the frequency of the carrier current plus or minus the frequency of the seismic signal.

The output from the transformer $T_1$ is amplified in the conventional manner by the thermionic tube 22. The output signal from the tube 22 is then fed into the band pass filter circuit 23 that comprises one resonance circuit made up of a variable condenser $C_1$ and an inductance $L_1$, and a second resonance circuit comprising the condenser $C_2$ and the inductance $L_2$. By tuning both of the resonance circuits to the frequency of the carrier wave, the frequency band pass can be critically adjusted by varying the coupling between the inductances $L_1$ and $L_2$. The output from the band pass filter being a selected band of frequencies, is amplified by the tube 24. The output from the tube 24 is demodulated by the full-wave rectifier 25. For sake of simplicity, copper oxide rectifiers have been illustrated. The rectified current signal output is then fed to a band eliminator filter $F_1$ through the amplifier $A_1$ to the recorder $R_1$, where it is recorded on a moving sensitized paper or photographic film in coordination with time.

There are three methods of operating the carrier and bridge in relation to the selective filter: (1) The bridge unbalanced and the carrier tuned to the frequency of resonance of the coupling filter. This allows the carrier plus the lower and upper side bands to appear at the detector. The selectivity of the filter then limits the side band width and the demodulated output gives the same frequency as the modulating seismic wave. The filtering characteristics are equivalent to a low pass filter. (2) The bridge balanced and the carried tuned to the frequency of resonance of the coupling filter. This allows only side bands to appear at the detector since the carrier has been eliminated at the bridge. The selectivity of the filter limits the side band width and the demodulated output gives twice the frequency of the modulating seismic waves. The filtering characteristics are equivalent to a low pass filter. (3) The bridge balanced and the carrier tuned below or above the frequency of resonance of the coupling system. This allows only a portion of one side band to pass through the coupling system. The carrier must be introduced to beat with this portion of one side band before detection. The output is at the same frequency as the modulating seismic wave and the filtering characteristics are equivalent to a band pass filter.

It is to be noted at this point that as many geophones as one desires to use, can be used with the instant invention while employing only one carrier wave. For purpose of illustrating this, there is shown in Figure 1 two complete recording channels showing the geophones $G_1$ and $G_n$ supplied by a single carrier current wave, the dotted lines in the conductors 19 between the geophones indicating that any desired number of geophones and their associated channels may be similarly connected.

By using the reactance geophone in a balanced bridge circuit as illustrated in Figure 1, with a carrier wave of relatively high frequency, the modulation products will be in the form of two side bands, that is, the carrier wave is suppressed, leaving two frequencies, $f_c$, the frequency of the carrier wave, plus $f_g$, the frequency of modulation by the geophone and $f_c$ minus $f_g$.

If the resonance circuits comprising the inductances and capacities $L_1$ and $L_2$ and $C_1$ and $C_2$ are resonated at the frequency of the carrier wave, resonance curves as illustrated in Figure 2 will be obtained. These curves have been plotted with frequency as abscissae and voltage as ordinates. Curve No. 1 is a resonance curve for a band pass filter that has been over-critically coupled. Curve No. 2 illustrates the resonance curve for critical coupling, while curve No. 3, having the sharpest peak of all but lower in amplitude, illustrates the effect of operating the band pass filter below critical coupling. By choosing the proper coupling for the inductances $L_1$ and $L_2$ in the band pass filter 23, the desired cut-off can be obtained that will cut-off all frequencies above 100 cycles per second or selective down to, for example, 60 cycles per second. If 100-cycle cut-off is desired, the coupling can be adjusted for a curve similar to No. 1, shown in Figure 2, where $f_1$ equals the frequency of the carrier current plus or minus 100 cycles; that is, 900 and 1100 cycles per second. This will allow only side bands up to 100 cycles to pass, the others being highly attenuated.

For 60-cycle cut-off, one would choose a coupling that would give a resonance curve similar to No. 3 in Figure 2, where $f_3$ equals 940 and 1060 cycles per second. This would allow only side bands up to 60 cycles to pass. In order to vary the response of the system to critically selected bands of frequencies, means are provided to vary the coupling between the inductances $L_1$ and $L_2$.

Two methods of varying the coupling between these coils are illustrated in Figures 5 and 6. In Figure 5 the distance between two coils $L_1$ and $L_2$ is varied mechanically by means of a screw 26 that threadedly engages a support 27. It is to be understood that Figure 5 is merely a diagrammatic illustration of the device. Any mechanical means that will vary the distance between the coils $L_1$ and $L_2$ may be used to change the coupling.

In Figure 6 there is illustrated an electrical method for varying the coupling between the two coils $L_1$ and $L_2$. In this case both of the coils would be fixed and a third coil $L_3$ interposed between them. Inductance $L_3$ and capacity $C_3$ are tuned to resonance at the frequency of the voltage that appears in $L_1$. By varying the resistance 30, the amount of reflected resistance into $L_1$ and $L_2$ can be controlled. Changing the reflected resistance changes the Q of the coils and thereby changes the selectivity of the filter. Numerous other ways may be employed for varying this coupling, for example, by the use of clockworks or lag circuits both of which are well known in the art. The coupling can be so varied that the frequency response of the system can be critically changed with time to pass relatively high frequencies first and lower frequencies with the passage of time. Since the reflections from relatively shallow strata are in the neighborhood of 50 to 75 cycles per second, and those from increasing depths are proportionally lower in frequency, a system having such control is highly desirable.

The instant invention is sufficiently flexible that it lends itself to the transmission of single side bands while suppressing the carrier wave. Referring to Figure 3 of the drawings, let the frequency of resonance $f_r$ of the coupling system be at 1050 cycles per second and a cut-off at 1020 cycles and 1080 cycles, the points 1 and 2 on the curve. Using a carrier of 1000 cycles per second, side bands are obtained of 1000 cycles plus the frequency of the seismic waves and 1000 cycles minus the frequency of the seismic waves, but the system will only pass currents having frequencies in a band between 1020 and 1080 cycles. Therefore, the carrier-modulated frequencies corresponding to frequencies between 20 and 80 cycles per second can pass and all others are highly attenuated.

As pointed out in connection with Figure 2, the points 1 and 2 of Figure 3 can also be adjusted for proper band width by varying the mutual coupling between the coils. Increased selectivity (sharper cut-off) can be obtained by using more than one of the band pass sections. This has an added advantage in that a much higher gain can be obtained from each stage because of the high terminating impedances and the gain in the coupling systems. By choosing the proper frequency the Q of the coils, that is, the ratio of the effective reactance of the coils to the resistance of the coils, may be calculated to give the maximum gain for any given band width.

With the instant invention it is possible to vary the band pass of the filter by changing the frequency of the carrier current during the time that the record is being recorded. Assume a band pass range between points 1 and 2 of Figure 4 of 40 cycles per second. Since at the first of the record, high frequencies are more desired, let $f_c$, the frequency of the carrier be lowered until a response of $f_g=50$ cycles per second falls at a point 1. This makes $f_c=970$ cycles or $f_1=1020$ cycles; that is, $f_1-50=970$ cycles, the frequency of the carrier. Such a system would respond to a carrier-modulated wave corresponding to seismic waves between 50 and 90 cycles per second. The end of the record, however, on which the lower reflections are recorded, requires a lower response that is as low as 20 cycles per second. Therefore, if $f_c$ is raised to 1000 cycles per second during the recording of the record, the final response will be from seismic waves from between 20 and 60 cycles per second. Therefore, by varying the frequency of the master oscillator (the carrier current frequency) the selectivity of the filter can be changed throughout the recording of the record.

The frequency of the oscillator 10 can be controlled in a number of ways, well understood by those skilled in the art. Perhaps the preferred way is by changing the effective inductance of the oscillatory circuit in manner set forth in the article entitled "Automatic Frequency Control" by Charles Travis which appears in the Proceedings of the Institute of Radio Engineers for October, 1935, volume 23, pages 1125–1141, and, in particular, pages 1131–1139. Systems of this type can be controlled from an expander such as is disclosed in the Minton and Shook Patent No. 2,301,739.

By using the output of a conventional reluctance type geophone to amplitude modulate a carrier wave, the same system of filtering can be used in the manner described above. A diagrammatic illustration of one channel using the conventional reluctance type geophone to amplitude modulate a carrier current wave is shown in Figure 7. The variable frequency control available with the filtering systems described above are equally applicable to this system.

Figure 8:
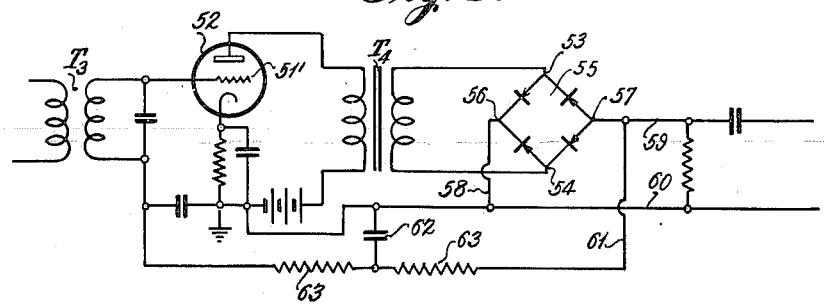
Figure 8 shows a wiring diagram that illustrates the manner in which automatic volume control can be obtained while using the instant invention.
Figure 9:
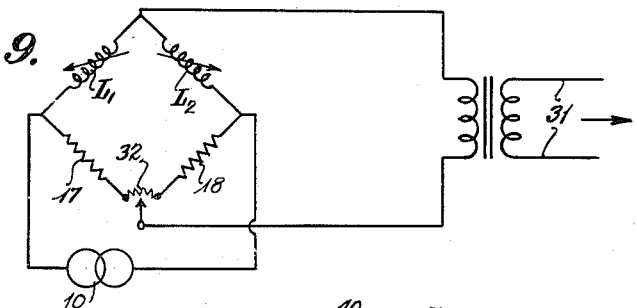
Figure 9 shows a reactance bridge type geophone circuit that illustrates a balancing control for the bridge circuit.

Reference is now made specifically to the inductance geophone as shown in Figure 9. Using a geophone of this type in a balanced bridge in which the carrier wave is suppressed and only side bands are present in the output plus modulation products that are easily filtered, that is, the signal from the output terminals 31 will be equal to $f_c \pm f_g$. Balancing of the geophone in this instance can be effected by the small variable resistance 32 in the bridge circuit. After the side bands have been filtered and amplified they must be rectified. This is done by ordinary means of detection or a copper oxide rectifier as illustrated in Figures 1, 8 and 10. Rectifying both side bands gives a double frequency output. This may be desirable but if the original frequency is wanted, the carrier wave must be introduced in the detector stage as shown in Figure 10, or the carrier may be introduced at the input of the rectifier, as shown in Fig. 1, where the carrier is applied to the tube 28, and the output of that tube is in parallel with the output of tube 24.

In Figure 10 the carrier wave is fed into the transformer 33, the output of which is fed into the primary windings of the transformers 34 and 35. The signal passed through transformer 35 is impressed across the balanced geophone bridge $G_2$. The output from bridge $G_2$ is passed through a resonance coupled band pass filter 36 to obtain a single side band. The single side band is then impressed across the terminals 37 and 38 of the rectifier 39. At this point the carrier signal supplied by the transformer 34 is impressed across the bridge rectifier 39 at the terminals 40 and 41. The carrier wave is introduced into the detector circuit where it is beat with the side band to obtain an envelope having the frequency of the seismic waves. Then after the frequency of the carrier wave has been filtered out by means of the filter 42, the output signal from the terminals 43 will be that of the seismic waves.

When using the inductance geophone in an unbalanced system, as in Figure 11, the carrier from the transformer 44 is supplied only at the terminals 45 and 46 of the bridge 47. The output from the bridge supplied to the amplifier 48 will then be $f_c$, $f_c+f_g$ and $f_c-f_g$. All of these frequencies are amplified in the same manner. They are then detected by a full or half wave rectifier 49 which will give, after filtering out the carrier frequency by means of the filter 50, an output signal at the terminals 51 having the original frequency of the seismic waves.

Since the output of the reactance geophone bridge is directly proportional to the applied bridge voltage, the sensitivity of the geophone can be directly controlled by varying the amplitude of the carrier current wave. The sensitivity of the geophones in this manner can be controlled independently, or the sensitivity of all of the geophones using a single current carrier wave can be controlled simultaneously, as indicated at 10a, Fig. 1. The amplitude of the current carrier wave can be varied by a system such as illustrated in the Minton and Shook Patent No. 2,301,739, to cause the gain of all the channels to increase simultaneously with time throughout the recording of the record.

Separate automatic volume control may be obtained in each channel by making use of the direct current voltage that appears in the detector stage to control the amplification of a preceding stage. This is illustrated in Figure 8 in which a portion of a recording channel is shown. The signal input from the transformer $T_3$ is impressed on the grid 51' of the vacuum tube 52 where it is amplified and conducted to the transformer $T_4$ whose output is connected to the terminals 53 and 54 of the rectifier 55. The output of the rectifier 55 from terminals 56 and 57 by means of conductors 58, 59 and 60 passes on to the recorder where it is recorded in coordination with time. This direct current voltage can also be fed back by means of the conductors 58 and 61 and impressed on the grid 51' of vacuum tube 52 with such polarity that it will control the amplifying characteristics of that tube. Condenser 62 and resistance 63 are placed in the feed-back circuit to provide the necessary delay interval in the control of the amplifying characteristic of tube 52. As explained above each channel of the system can be connected in this manner to automatically control the volume of the signals passing through the channels.

We claim:

1. A method of detecting and recording seismic waves that comprises generating an electrical carrier current wave of a frequency higher than that of the seismic waves to be detected, modulating said carrier current wave in accordance with said seismic waves and in a balanced manner to suppress the carrier current wave, filtering the resultant side bands to eliminate unwanted frequencies, controlling the sensitivity of the system by varying the amplitude of the carrier current wave, and recording the envelope of the output signal.

2. A method of detecting and recording seismic waves that comprises generating an electrical carrier current wave of a frequency higher than that of the seismic waves to be detected, reactively modulating said carrier current wave in accordance with said seismic waves and in a balanced manner to suppress the carrier current wave, filtering the resultant side bands by resonant coupling to eliminate unwanted frequencies, controlling the sensitivity of the system by varying the amplitude of the carrier current wave, and recording the envelope of the output signal.

3. A method of detecting and recording seismic waves that comprises generating an electrical carrier current wave of a frequency higher than that of the seismic waves to be detected, modulating said carrier current wave in accordance with said seismic waves, gradually varying the amplitude of the current carrier wave with time to vary the sensitivity of the system while detecting a series of waves, filtering said modulated carrier current wave to eliminate unwanted frequencies, rectifying, and recording the output signal.

4. A method of detecting and recording seismic waves that comprises generating an electrical carrier current wave of a frequency higher than that of the seismic waves to be detected, modulating said carrier current wave in accordance with said seismic waves, gradually varying the amplitude of the current carrier wave with time to vary the sensitivity of the system while detecting a series of waves, gradually varying the frequency of the current carrier wave to vary the frequency response of the system during the recording of a series of waves, filtering said modulated carrier current wave to eliminate unwanted frequencies, and rectifying and recording the output signal.

5. A method of detecting and recording seismic waves that comprises generating an electrical carrier current wave of a frequency higher than that of the seismic waves to be detected, modulating said carrier current wave in a balanced manner in accordance with said seismic waves, gradually varying the amplitude of the current carrier wave with time to vary the sensitivity of the system while detecting a series of waves, gradually varying the frequency of the current carrier wave to vary the frequency response of the system during the recording of a series of waves, filtering the products of modulation to eliminate unwanted frequencies, reintroducing the carrier wave to obtain the modulating frequency, rectifying the modulation products, and recording the output signal.

6. A method of detecting and recording seismic waves that comprises generating an electrical carrier current wave of a frequency higher than that of the seismic waves to be detected, modulating said carrier current wave in a balanced manner and reactively in accordance with said seismic waves, gradually varying the amplitude of the current carrier wave with time to vary the sensitivity of the system while detecting a series of waves, gradually varying the frequency of the current carrier wave to vary the frequency response of the system during the recording of a series of waves, filtering the products of modulation to obtain a single side band, reintroducing the carrier wave to obtain the modulating frequency, rectifying, and recording the output signal.

7. A method of detecting and recording seismic waves that comprises generating an electrical carrier current wave of a frequency higher than that of the seismic waves to be detected, modulating said carrier current wave in a balanced manner in accordance with said seismic waves, gradually varying the amplitude of the current carrier wave with time to vary the sensitivity of the system while detecting a series of waves, gradually varying the frequency of the current carrier wave to vary the frequency response of the system during the recording of a series of waves, filtering the products of modulation to obtain a single side band, electrically limiting the width of the side band, introducing the carrier wave to obtain the modulating frequency, rectifying, and recording the output signal.

8. In a system having a plurality of amplifying stages, the method of detecting and recording seismic waves which comprises generating an electrical carrier current wave of a frequency higher than that of the seismic waves to be detected, modulating said carrier current wave in accordance with said seismic waves, gradually varying the amplitude of the carrier current wave with time to vary the sensitivity of the system while detecting a series of waves, filtering said modulated carrier current wave to eliminate unwanted frequencies, rectifying the filtered signals, feeding back a portion of the rectified signal to control the volume obtainable from a preceding amplifying stage, and recording the output signal.

9. In a system having a thermionic tube in each of a plurality of amplifying stages, the method of detecting and recording seismic waves which comprises generating an electrical carrier current wave of a frequency higher than that of the seismic waves to be detected, modulating said carrier current wave in accordance with said seismic waves, gradually varying the amplitude of the carrier current wave with time to vary the sensitivity of the system while detecting a series of waves, filtering said modulated carrier current wave to eliminate unwanted frequencies, rectifying the filtered signals, using a portion of the rectified signals as a varying grid bias potential for a thermionic tube in a preceding stage to control the volume automatically, and recording the output signals.

10. Apparatus for detecting and recording seismic waves that comprises means for generating an electrical carrier current wave of a frequency higher than that of the seismic waves to be detected, means for balanced modulating said carrier current wave in accordance with said seismic waves, a filter for filtering said modulated carrier current wave to eliminate unwanted frequencies, means for reintroducing the carrier wave to eliminate double frequencies, and a recorder for recording the envelope of the output signal.

11. Apparatus for detecting and recording seismic waves that comprises means to generate an electrical carrier current wave of a frequency higher than that of the seismic waves to be detected, means to modulate said carrier current wave in accordance with said seismic waves, means to filter said modulated carrier current wave to eliminate unwanted frequencies, a recorder for recording the filtered signals, and means to vary the amplitude of the carrier current wave to vary the sensitivity of the apparatus.

12. Apparatus including an amplifier for detecting and recording seismic waves which comprises means for generating an electrical carrier current wave of a frequency higher than that of the seismic waves to be detected, means for balanceably modulating said carrier current wave in accordance with said seismic waves, a filter for filtering said modulated carrier current wave to eliminate unwanted frequencies, means for reintroducing the carrier wave to eliminate double frequencies, means for rectifying the filtered carrier current wave to produce an output signal, means for utilizing a portion of said rectified wave automatically to control the gain of said amplifier, and a recorder for recording the envelope of the output signal.

JOHN P. MINTON.
ROBERT A. BRODING.